US012810654B2

(12) United States Patent
Abraham

(10) Patent No.: US 12,810,654 B2
(45) Date of Patent: Nov. 24, 2026

(54) MOIRÉ PATTERN DETECTION IN DIGITAL IMAGES AND A LIVENESS DETECTION SYSTEM THEREOF

(71) Applicant: AMADEUS S.A.S., Biot (FR)

(72) Inventor: Eldho Abraham, Vellikulangara (IN)

(73) Assignee: AMADEUS S.A.S., Biot (FR)

( * ) Notice: Subject to any disclaimer, the term of this patent is extended or adjusted under 35 U.S.C. 154(b) by 438 days.

(21) Appl. No.: 18/260,360

(22) PCT Filed: Dec. 17, 2021

(86) PCT No.: PCT/EP2021/086391
§ 371 (c)(1),
(2) Date: Jul. 5, 2023

(87) PCT Pub. No.: WO2022/148635
PCT Pub. Date: Jul. 14, 2022

(65) Prior Publication Data

US 2024/0071142 A1 Feb. 29, 2024

(30) Foreign Application Priority Data

Jan. 6, 2021 (EP) .................................... 21305016

(51) Int. Cl.
*G06V 40/40* (2022.01)
*G06T 5/50* (2006.01)
(Continued)

(52) U.S. Cl.
CPC ................ *G06V 40/40* (2022.01); *G06T 5/50* (2013.01); *G06T 7/11* (2017.01); *G06V 10/24* (2022.01);
(Continued)

(58) Field of Classification Search
CPC ...... G06V 40/40; G06V 40/171; G06V 40/45; G06V 40/172; G06V 40/168; G06V 10/24;
(Continued)

(56) References Cited

U.S. PATENT DOCUMENTS

| | | | | |
|---|---|---|---|---|
| 2016/0071275 | A1 * | 3/2016 | Hirvonen ............... | H04N 23/63 382/103 |
| 2018/0005020 | A1 | 1/2018 | Rieul et al. | |

(Continued)

FOREIGN PATENT DOCUMENTS

| | | | |
|---|---|---|---|
| EP | 3467709 | A1 | 4/2019 |
| JP | 2019169940 | A | 10/2019 |
| WO | WO-2020053984 | A1 | 3/2020 |

OTHER PUBLICATIONS

Patel, Keyurkumar, et al. "Live face video vs. spoof face video: Use of moiré patterns to detect replay video attacks." 2015 International Conference on Biometrics (ICB). IEEE, 2015.*

(Continued)

*Primary Examiner* — Emily C Terrell
(74) *Attorney, Agent, or Firm* — Perry + Currier Inc.

(57) ABSTRACT

The present invention relates the detection of moire patterns in digital images, which is performed by processing a plurality of digital images of the captured subject and/or scene, each taken at a different image exposure and/or resolution. Furthermore, the present invention relates to a method and system for assessing liveness of captured biometric features based on the detection of moire patterns from the plurality of digital images.

14 Claims, 9 Drawing Sheets

(51) Int. Cl.
*G06T 7/11* (2017.01)
*G06V 10/24* (2022.01)
*G06V 10/60* (2022.01)
*G06V 10/70* (2022.01)
*G06V 40/16* (2022.01)

(52) U.S. Cl.
CPC .............. *G06V 10/60* (2022.01); *G06V 10/70* (2022.01); *G06V 40/171* (2022.01); *G06T 2207/10144* (2013.01); *G06T 2207/20208* (2013.01); *G06T 2207/20221* (2013.01)

(58) Field of Classification Search
CPC .................. G06V 40/16; G06V 40/167; G06T 2207/10016; G06T 2207/10144; G06T 2207/20221; G06T 2207/30168; G06T 2207/30196; G06T 2207/30201; H04N 1/00336
See application file for complete search history.

(56) References Cited

U.S. PATENT DOCUMENTS

2018/0034852 A1* 2/2018 Goldenberg ........ H04L 63/1416
2019/0026544 A1* 1/2019 Hua ..................... A61B 5/1128
2019/0034746 A1* 1/2019 Feng ..................... G06T 7/0002
2019/0354746 A1* 11/2019 Zhang .................. G06V 40/171
2021/0216801 A1* 7/2021 Abe ....................... G06V 40/10
2021/0248401 A1* 8/2021 Timoshenko .......... G06V 40/40
2021/0304359 A1* 9/2021 Chen ........................ G06N 7/01

OTHER PUBLICATIONS

Patel, Keyurkumar, Hu Han, and Anil K. Jain. "Secure face unlock: Spoof detection on smartphones." IEEE transactions on information forensics and security 11.10 (2016): 2268-2283.*

Garcia, Diogo Caetano et al. "Face-Spoofing 2D-Detection Based on Moiré-Pattern Analysis." IEEE Transactions on Information Forensics and Security 4.10 (2015): 778-786. Abstract.

Sun, Yujing et al. "Moiré photo restoration using multiresolution convolutional neural networks." IEEE Transactions on Image Processing 27.8 (2018): 4160-4172.

Anonymous, "Exposure fusion", Wikipedia, Aug. 5, 2011, URL: https://en.wikipedia.org/wiki/Exposure_fusion.

Abraham, Eldho, "Moire Pattern Detection using Wavelet Decomposition and Convolutional Neural Network," 2018 IEEE Symposium Series on Computational Intelligence (SSCI), Bangalore, India, 2018, pp. 1275-1279, doi: 10.1109/SSCI.2018.8628746. Abstract.

Edmunds, Taiamiti. Protection of 2D face identification systems against spoofing attacks. Diss. Université Grenoble Alpes, 2017.

* cited by examiner

MOIRÉ PATTERN DETECTION IN DIGITAL IMAGES AND A LIVENESS DETECTION SYSTEM THEREOF

FIELD

The present invention relates to the detection of moiré patterns in digital images. Furthermore, the present invention relates to the liveness detection of captured biometric features for biometric verification.

BACKGROUND

Moiré patterns are considered to be interference patterns occurring due to the overlap of the digital grids of the camera sensor resulting in a high-frequency noise in the image. Detection and removal of these patterns is a crucial step in many applications. For example, detection and removal of moiré patterns is an important step in a biometric verification system, where these patterns may be used to determine liveness of the captured biometric features, thereby preventing spoofing attacks. Similarly, moiré patterns may be used in scanning applications to improve Optical Character Recognition (OCR).

An example of a known method for detecting moiré patterns in a digital image is presented in E. Abraham, "Moiré Pattern Detection using Wavelet Decomposition and Convolutional Neural Network," 2018 IEEE Symposium Series on Computational Intelligence (SSCI), Bangalore, India, 2018, pp. 1275-1279, doi: 10.1109/SSCI.2018.8628746. A disadvantage of the current techniques for detecting moiré patterns is that their detection accuracy may be affected by the intensity profile of the digital image. This is because the frequency strength of the moiré patterns, which determines their visibility in the captured image, highly depends on the pixel intensity of the digital image. For example, the lower the pixel intensity of the captured, thereby the darker the captured image, the lower the frequency strength of the moiré patterns present in the image. Similar effects may be observed in overexposed areas of the captured image. As a result, due to the pixel intensity variations in a digital image, the moiré patterns may not be accurately detected and/or extracted, which may be detrimental in preventing spoofing attacks in a biometric verification system.

SUMMARY

An aim of the present invention is to provide a system and a method for detecting moiré patterns in a digital image that overcomes the disadvantages of the prior art solutions.

A further aim of the present invention is to provide a system and a method for verifying liveness of captured biometric features of a person in a biometric verification system.

The aims of the present invention are achieved according to the invention with the system and method showing the technical characteristics of the respective independent claims. Preferred embodiments of the present invention are disclosed in the dependent claims.

According to an aspect of the present invention, a method for detecting moiré pattern information in digital images is presented. The method comprises the steps of:

receiving a set of digital images of a subject and/or scene, the set of digital images comprising images captured by one or more cameras and at different resolutions and/or exposure;

processing each digital image in the set to determine sections of the imaged subject and/or scene containing moiré pattern information at the corresponding image resolution and/or exposure selecting digital images from the set with sections of the imaged subject and/or scene containing moiré pattern information; and generating a merged digital image for the captured subject and/or scene from the selected digital images, the merged digital image comprising the moiré pattern information detected in each of the selected digital images.

The method of the present invention enhances the detection of moiré patterns in a digital image by processing and combining moiré pattern information detected from a plurality of digital images of the same subject and/or scene captured at different image resolutions and/or exposures. In general, the pixel intensity of a captured object and/or scene would vary within the captured digital image, resulting in image sections having different light/pixel intensity values. As such, regions of the digital image may be presented with different light/pixel intensity values. Moiré patterns are dependent on the pixel intensity of the digital image. For example, moiré patterns may be difficult to detect in dark or overexposed regions of a captured image. Therefore, with traditional techniques, only a small portion of the moiré patterns may be detected in a digital image, due to camera sensor limitations and lighting conditions. Enhancing detection of moiré patterns from regions of the digital image having different pixel intensity values is important in a range of applications which include but not limited to biometric verification, Optical Character Recognition (OCR), and the like. The method of the present invention overcomes the disadvantages of the prior art solutions by extracting moiré pattern information from digital images of the same subject and/or scene captured at different image resolution and/or exposure. As such, it is possible to detect moiré patterns from different regions of the digital images. For example, by progressively increasing the image exposure between successive digital images, it is possible to increase the light intensity of darker regions of the digital images, which may result in the exposure of moiré patterns, leading to their accurate detection. Similarly, by varying the image resolution between successive digital images, it is possible to change the moiré patterns captured in the digital image. As such, different moiré patterns may emerge depending on the image resolution, which may provide further enhance the detection of the moiré patterns from the captured image and/or scene In the method presented herein, moiré pattern information detected and/or extracted from the set of digital images is combined into a single digital image for the representation of the captured object and/or scene. The combined digital image may be generated by combining details from different captured digital images in the set that contain moiré patterns. For example, the merged digital image may be generated using a high dynamic range imaging technique known in the art, which involves capturing multiple images of the same scene using different exposure values, and then combining those images that contained moiré patterns into a single image that represents the range of tonal values within the captured scene and/or object. As such, the merged digital image would contain moiré pattern information from different areas of the digital image, thereby overcoming the disadvantages of the prior art solutions.

According to embodiments of the present invention, the detection of Moiré patterns may be performed using wavelet decomposition and/or a multi-input deep Convolutional Neural Network (CNN).

According to embodiments of the present invention, processing of the set of digital images comprises aligning the subject and/or scene captured in each of the digital images in the set. In general, to compensate for any movement of the subject and/or scene occurred between successive digital images, e.g. head movement of the captured person, the digital images are aligned. For example, the alignment of the digital images may be performed using known image registration techniques known in the art, such as processing the digital images using a digital image aligning algorithm, or another known techniques. For example, image registration may be based on feature registration, pixel-based alignment, or any other known technique.

According to embodiments of the present invention, processing the digital images comprises segmenting each digital image into a grid of predetermined dimensions. According to embodiments of the present invention, processing of the digital images comprises detecting in each digital image the grid sections comprising moiré pattern information. Segmentation aids the temporal analysis of the digital images in the set, thereby simplifying the detection of similar regions in the set of digital images. As such, sections of the digital images containing moiré pattern information may be easily detected and compared to corresponding sections of the remaining digital images. It should be noted that the segmentation of an image may be performed in different ways. For example, the image analysis may grid-based, where the digital image is divided into subsections, or it may object segmentation based, where the digital images are analysed to detect similar regions, e.g. the face of a person.

According to embodiments of the present invention, processing of the digital images comprises analysing the luminous intensity of each digital image in the stack both in spatial and temporal direction to determine a combined intensity profile for the set of digital images. Based on the segmentation, the pixel intensity of each digital image is analysed both in spatial and temporal direction to obtain the intensity profile of the stacked digital images. The intensity profile information may be used to determine the frequency strength and/or pattern of the moiré interference noise detected in each digital image and correlate them with the corresponding image exposure and/or resolution in the stack of digital images. The correlation of Moiré patterns may be performed using Feature detection and Matching methods like Fourier/Wavelet Transform, SURF, SIFT features, and the like. Also, the correlation may be performed using trained Deep Learning networks like Convolution Neural Networks (CNN).

According to embodiments of the present invention, generating the merged digital image comprises combining details from different captured digital images in the set that contain moiré patterns into a single image that represents the range of tonal values within the captured scene and/or object. Further, generating of the merged digital image may comprise spatially correlating the extracted moiré pattern information detected from each digital image in the set. According to embodiments of the present invention, generating of the merged digital image comprises extracting a frequency profile of the moiré pattern information. The moiré patterns detected and/or extracted from each digital image may be mapped on the segmentation grid, thereby identifying the sections of the digital image containing moiré pattern information. Due to the variation in the exposure and/or resolution of the digital images in the set, the frequency strength of the moiré patterns detected in each digital image may be different from one another. The merged digital image may be generated based on the selection and combination of digital images and/or sections of digital images. For example, the digital images and/or sections of digital images may be selected based on the detected moiré pattern information meeting certain criteria, e.g. the frequency strength being within a specific range. As such, the extracted moiré patterns detected and/or extracted from the selected sections may be spatially correlated to determine the distribution profile of the resulting moiré frequency in the merged digital image. Furthermore, other known methods may be used to generate the merged digital image. For example, the merged image may be generated by selecting the max frequency or combining the low-high frequencies of the detected moiré patterns together in the temporal direction in the stack of digital images.

According to embodiments of the present invention, the merged digital image is a high dynamic range image.

According to a second aspect of the present invention, a method for determining liveness of biometric features of a person is presented. The method comprises the steps of: capturing a set of digital images of one or biometric features of a person, the set of digital images comprising images captured by one or more cameras and at different resolutions and/or exposure;

- detecting moiré pattern information from the digital images and accordingly generate a merged digital image for the one or more biometric features according to embodiments of the first aspect;
- extracting moiré pattern information from the merged digital image; and
- determining, based on the extracted moiré pattern information, liveness of the one or more biometric features captured in the digital image.

According to embodiments of the second aspect of the present invention, determining liveness comprises the step of extracting a moiré frequency strength from the moiré pattern information and comparing the extracted moiré frequency strength with a liveness threshold.

According to embodiments of the second aspect of the present invention, if the extracted moiré frequency strength is within a first range from the liveness threshold, validating the digital image of the one or more biometric features, otherwise rejecting the digital image.

The method of the present invention may be used in a range of applications. For example, the method for detecting moiré patterns in digital images may be part of a biometric verification system. In a biometric verification system, it is important to be able to distinguish between a spoofing attack and a legitimate access request form a registered user. In spoofing attacks, e.g. facial spoofing, a fraudulent user may try to gain illegitimate access by using a photo, video, or other material of an authorised user's face. As such, the biometric verification system needs to be able to assess the liveness of the captured biometric features accurately. Moiré patterns may be used to determine liveness of the captured biometric features by assessing their resulting frequency and/or pattern profile. For example, capturing an object from a photograph, or video would result in different moiré patterns than capturing the same object in the real world. However, since moiré patterns depend on the intensity profile of the captured digital image, the biometric verification systems may incorrectly detect the moiré patterns from a photograph and/or video of a registered user, thereby leading to a successful spoofing attack. Similarly, a biometric identification system may reject legitimate biometric verification request from a registered user due to the incorrect detection of the Moiré pattern from a live captured digital image. For example, in images with lower intensity, i.e. darker images, the moiré patterns may not be visible, or their frequency may low, and as such moiré patterns may not be accurately detected by the biometric verification system resulting in a successful spoofing attack. The present invention overcomes this issue by extracting a profile of the moiré patterns detected from a plurality of images of the same subject that have been captured at different resolution and/or exposure. As such, with the present invention, it is possible to accurately extract the profile and/or frequency of the moiré patterns from a digital image, thereby improving the accuracy of the biometric verification systems.

According to embodiments of the second aspect of the present invention, capturing of the digital images comprises varying the resolution and/or exposure of the at least one camera within a predefined range between successive capturing of digital images of the one or more biometric features. According to embodiments of the second aspect of the present invention, the resolution and/or exposure of the camera is varied by a predetermined value for each digital image in the set. For example, the exposure and/or image resolution may be progressively adjusted in a stepwise process, wherein each adjustment step is of a predetermined value. For example, the exposure of each digital image may be varied by adjusting the shutter speed and/or aperture of the camera. Similarly, the image resolution may be adjusted by changing the resolution of the camera sensors.

According to embodiments of the second aspect of the present invention, the one or more biometric features are facial features.

According to a third aspect of the present invention, a liveness detection system for biometric authentication is presented, the system comprising:

- at least one camera configured to capture digital images of the target biometric features of a person presented for biometric authentication; and
- a processor configured to determine liveness of the captured biometric features according to embodiments of the second aspect.

BRIEF DESCRIPTION OF THE DRAWINGS

The following drawings are provided as an example to explain further and describe various aspects of the invention.

DETAILED DESCRIPTION

The present invention will be illustrated using the exemplified embodiments shown in FIGS. 1 to 10, which will be described in more detail below. It should be noted that any references made to dimensions are only indicative and do not restrict the invention in any way. While this invention has been shown and described with reference to certain illustrated embodiments thereof, it will be understood by those skilled in the art that various changes in form and details may be made therein without departing from the scope of the invention encompassed by the appended claims. Furthermore, while the invention has been described with references to a particular system and method for detecting moiré patterns in digital images and a corresponding method and system for assessing liveness of biometric features in a biometric verification system, it should be understood by those skilled in the art that the present system and method may be used for the detection of moiré patterns in other application such as in Optical Character Recognition (OCR) applications without departing from the scope of the invention encompassed by the appended claims.

Figure 2:
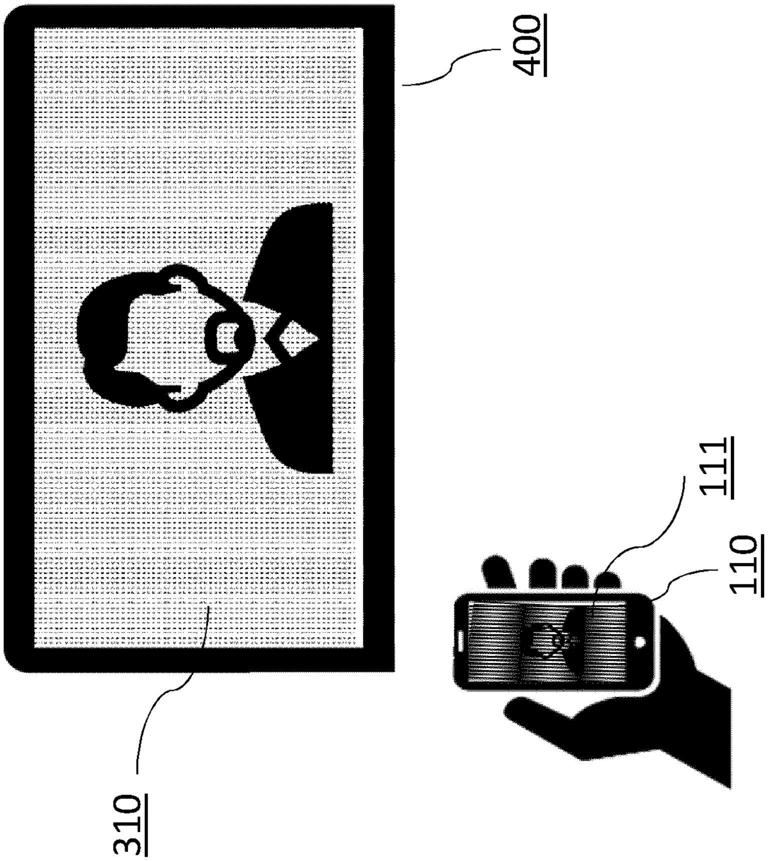
FIG. 2 shows an example of capturing a digital image of a screen or a photograph showing an image of the user.
Figure 1:
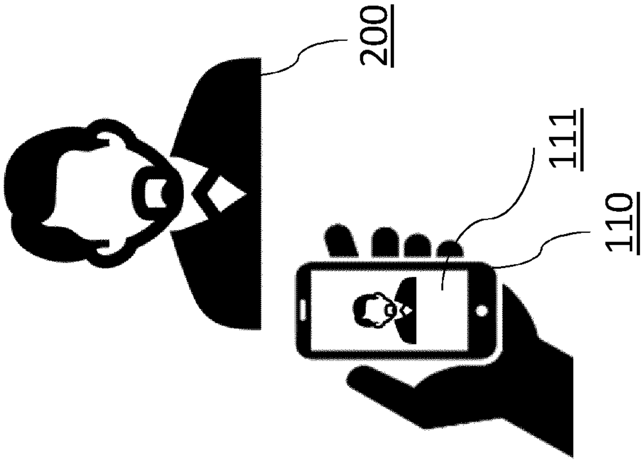
FIG. 1 shows an example of capturing a live image of the user.

Detection of Moiré patterns in digital images may be used in a range of applications. For example, detection of moiré patterns may aid the detection of the liveness of biometric features in a biometric verification system. Similarly, detection of moiré patterns may be used in an OCR application to improve the detection of characters from a scanned document or a photo. In particular, with regards to the liveness detection, moiré pattern detection in the captured digital images has been shown to improve the liveness detection accuracy. It is known that moiré patterns detected in a captured digital image of a live subject, e.g. a person sitting in front of a camera, would be different from the moiré patterns detected when the captured image is a scan of a document or a photograph of the same subject. As shown in FIG. 1, capturing the digital image of a person 200 using a capturing equipment 110, e.g. the camera of a mobile phone, may result in the detected moiré patterns having a first frequency strength and/or profile. For example, when the image is displayed on the display of the phone 111, the moiré patterns detected may be less visible, thus having a lower strength, or have a different frequency profile. However, capturing a digital image of a photograph 300 of the same subject may result in moiré patterns having a second frequency strength and/or profile. For example, as shown in FIG. 2, the moiré patterns detected and/or extracted from a captured digital image of the photograph 400 displayed on the display screen 111 of the mobile phone 110 may be of higher frequency strength and/or different profile compared to moiré patterns detected in FIG. 1. This is because, the photograph 400 of the person already contains moiré patterns 310, which are captured and may be amplified by the image sensor of the capture device 110. As such, by detecting the moiré patterns in the captured digital images, it is possible to detect liveness of a subject, which is particularly useful in preventing biometric spoofing attacks.

Figure 3:
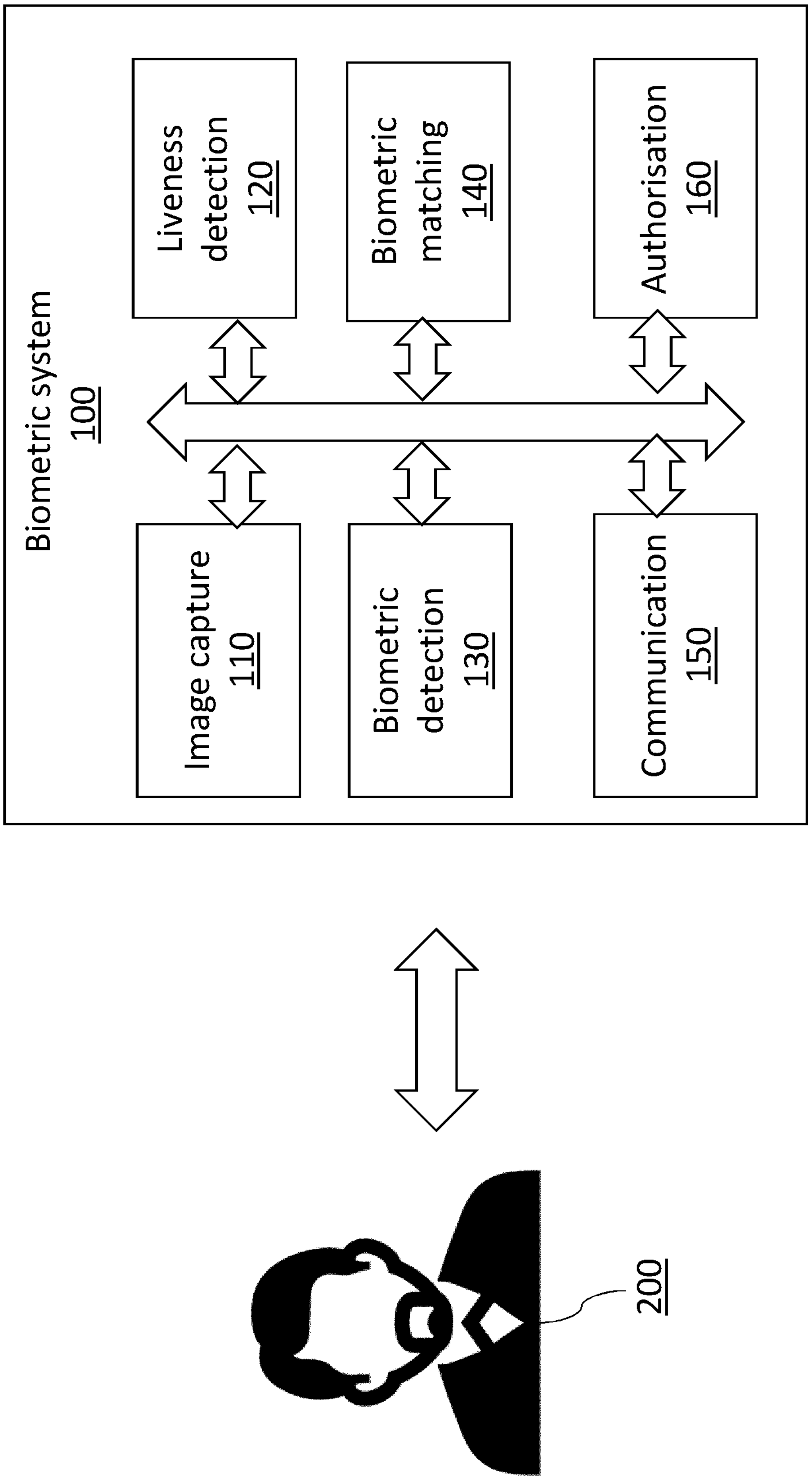
FIG. 3 shows an example of a biometric verification system according to embodiments of the present invention.

FIG. 3 shows an example of a biometric verification system 100 configured to verify the identity of a user according to embodiments of the present invention. The biometric verification system 100 may be configured to capture biometric features, e.g. facial features, via a capturing module 110, e.g. a camera. The captured biometric features may be processed by a liveness detection module 120 to determine liveness. Once liveness is determined, the biometric features may be detected in the captured digital images by a biometric detection module 130, and then matched to stored biometric features by a biometric matching module 140. If a biometric match is identified, then the user is verified and additionally may be granted permission by an authorisation module 160 to perform an action, e.g. to access an application and the like. A communication module 150 may be provided to communicate with the user and with other connected systems. At any stage, biometric verification may be aborted. For example, if the liveness detection fails or matching biometric feature is not found.

Traditionally liveness detection may be performed by detecting moiré patterns on the captured image. However, a disadvantage of the known techniques is that they rely on extracting moiré patterns from a single image. It is well known that the accuracy of moiré pattern detection may be affected by the pixel intensity of the captured image. For example, it has been found that the lower the pixel intensity, and thus the darker the captured image, the lower the frequency strength of the moiré patterns. As such, the accuracy of the liveness detection may be highly affected by the pixel intensity of the captured image. Fluctuations in the accuracy of the liveness detection may lead to false positives, e.g. successful spoofing attacks, or false-negative, e.g. incorrectly rejecting live biometric features of a user. In contrast, the liveness detection system of the present invention aims to improve the liveness detection accuracy by assessing the moiré patterns detected from a set of multi-variate digital images taken at different image resolutions and/or exposures. In other words, the present invention varies the image resolution and/or exposure of the captured digital images to adjust the pixel intensity of the captured biometric features and/or the moiré patterns generated. By adjusting the light intensity and/or resolution of a captured image it is possible to adjust the frequency strength and/or profile of the detected and/or extracted moiré patterns, thus enabling detection of moiré patterns from captured images having varying pixel intensity.

Figure 4:
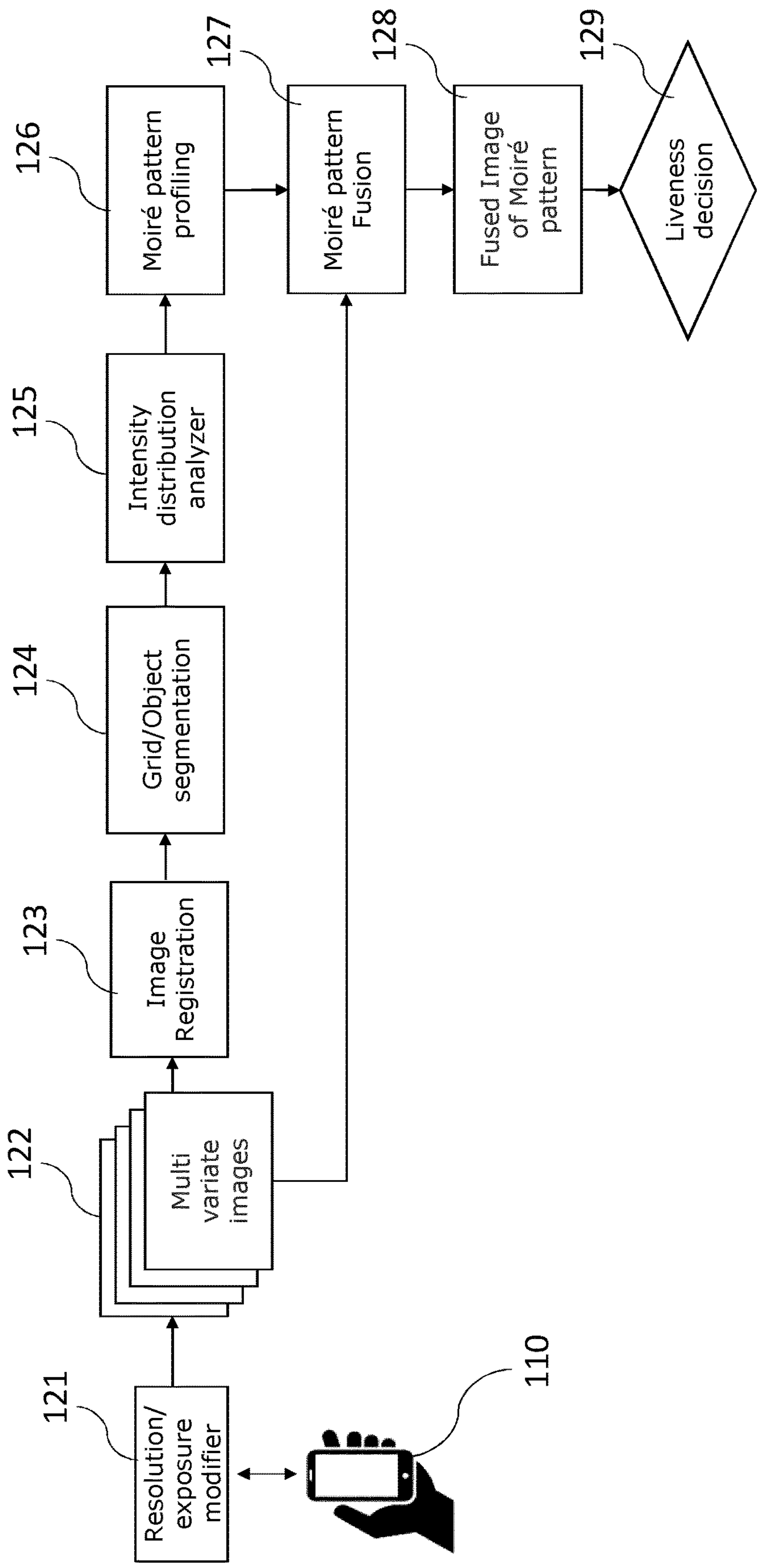
FIG. 4 shows an example of a processing pipeline for detecting liveness of biometric features according to embodiments of the present invention.
Figure 5:
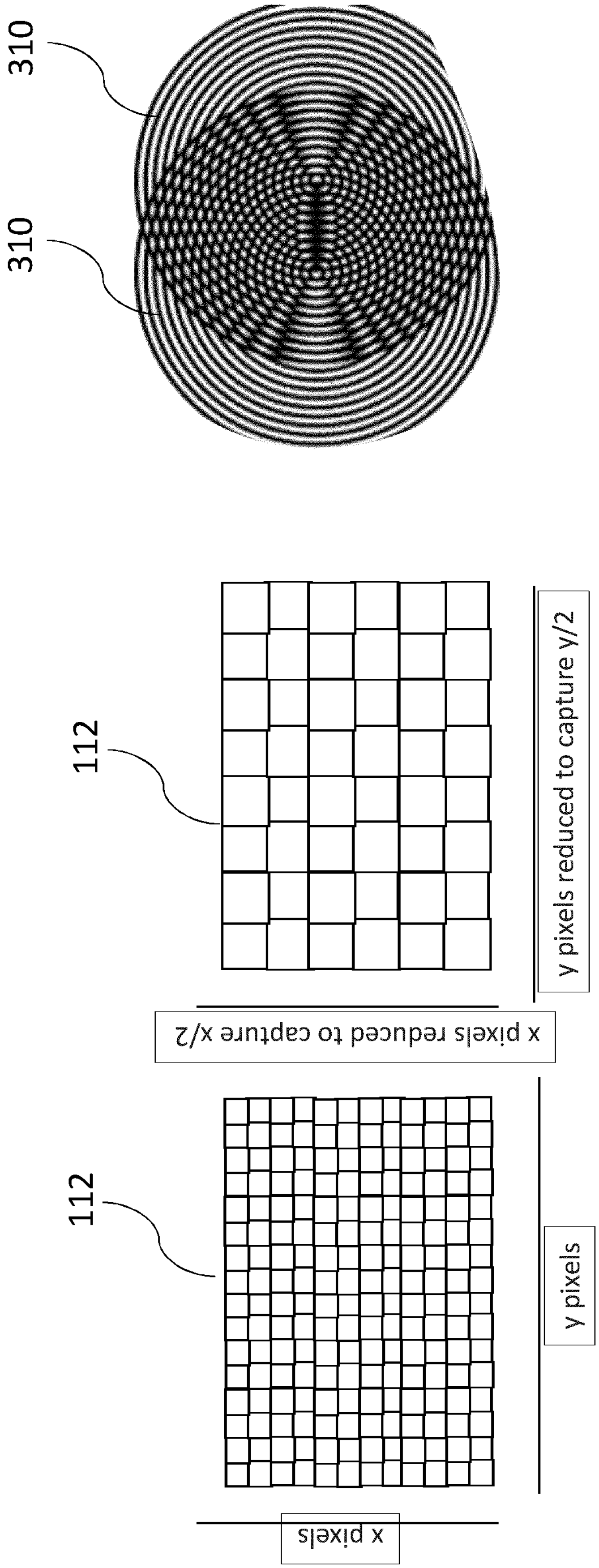
FIG. 5 shows an example of varying the resolution of the camera sensor according to embodiments of the present invention.

FIG. 4 shows an example of a liveness detection processing pipeline according to embodiments of the present invention. The liveness detection processing pipeline is based on detecting moiré patterns from a set of multi-variate digital images of the captured subject. In the context of the present invention, multi-variate digital images refer to digital images captured by one or more capture imaging devices 110 at different image resolutions and/or exposures. The liveness detection processing pipeline may be part of the liveness detection module 120 of the biometric verification system 100. As shown in FIG. 4, an image capturing device 110 may be provided, e.g. a camera of a mobile phone or the like, that is capable of capturing digital images. Once an authentication request is received at the biometric verification system 100, the liveness detection module 120 may operate the capturing device 120 to capture a set of multi-variate digital images 122, of the subject and/or scene, e.g. facial features of a person. For each digital image captured, the resolution and/or exposure setting of the capturing device 110 may be altered by a predetermined value using a resolution/exposure modifier module 121. For example, for each digital image, the aperture and/or shutter speed of the camera, which controls the image exposure, may be varied by a predetermined value. Similarly, the resolution of each digital image in the set may be altered, e.g. increase or decrease by a predetermined value. The image resolution and/or exposure may be varied for each digital image 122 by adjusting firmware and/or hardware settings of the capturing module 110. For example, the resolution/exposure modifier 121 may be programmed to control the capture module 110 so that each digital image is taken at a different image exposure and/or resolution, e.g. by changing the shutter speed, aperture, and/or image resolution. Furthermore, the capturing module 110 may comprise a plurality of cameras, each configured to capture digital images at different image resolutions and/or exposures. As such, the resolution/exposure modifier 121 may switch between the different cameras of the capturing module to capture the digital images 122. In addition, the resolution of the capturing module 110 may be adjusted by providing an additional hardware component in front of the camera sensor to adjust the camera sensor resolution similarly to coded photography. For example, the additional hardware component may be a mask that is configured to be placed in front of the camera sensors so that the camera sensor resolution is reduced. The external mask may be designed such that when it is placed in front of a camera sensor reduces its resolution. An example of coded photography using hardware components is discussed in Raskar, Ramesh. (2009) "Computational Photography: Epsilon to Coded Photograph". As shown in FIG. 5, a reduction in the camera sensor 112 resolution may result in different moiré patterns 310 in the digital image, which may be used to assess liveness of the captured subject and/or scene. The number of digital images 122 to be captured entirely depends on the application and the detailed required. At least two images may be captured at different exposure and/or resolution.

Returning to FIG. 4, once the desired number of digital images in the set have been acquired, an image registration module 123 may be provided to align the captured subject and/or scene within the set of digital images 122. The image registration may be performed as a post-processing step using any known available algorithm. Equally, image registration may be performed during capturing of the digital image, e.g. using sensors to detect and remove the movement from the captured image. Once aligned, each image is segmented into sections using a segmentation module 124. The segmentation may be a grid segmentation or any other known segmentation technique, e.g. object and/or shape detection, and the like. Based on the segmentation results, the intensity profile of each digital image is analysed using an intensity analysis module 125. The intensity analysis module 125 is configured to analyse, using any known methods, the light intensity of the digital image both in the spatial and temporal direction, thereby generating an intensity profile for the set of digital images. Based on the intensity profile, each digital image may be correlated with the corresponding image resolution and/or exposure. The moiré patterns may be detected in each digital image, by determining for each digital image the sections containing moiré pattern information. For example, a section may be considered as containing moiré pattern information if the corresponding frequency strength is within a predetermined range. The moiré patterns may be detected using a known method such as wavelet techniques known in the art. Once moiré patterns have been identified in each digital image 122, a profile of the moiré patterns within the set of digital images may be generated using a moiré pattern profiling module 126. The digital images containing moiré patterns may be merged into a single digital image, e.g. using a high-dynamic-range (HDR) technique or similar algorithms. In this way, the relevant tonal values and pixel intensities of the relevant digital images may be fused together into a single image resulting in the fusion of the moiré patterns identified at each corresponding image resolution and/or exposure. A fused image of the moiré patterns in the merged digital image may be generated using a fused moiré pattern generation module 127. The fused moiré pattern image may be fed to a liveness detection algorithm, whereby the frequency strength and/or profile of the fused moiré pattern may be compared to a predetermine liveness threshold and/or value. The result may be fed to the remaining modules of a biometric verification system 100. For example, if liveness detection returns a negative result, then the captured biometric features may be considered as being generated from a fake image, thereby rejecting the request. Otherwise, the process may continue to the biometric detection and matching, as previously explained with reference to FIG. 3.

In different applications, such an OCR application, the processing pipeline may be adapted accordingly so that it only applies to the detection of the moiré patterns in a merged digital image, such as the one generated by the fused image of moiré patterns module 128. Similarly, a more simplified process pipeline may be adopted, that may include the steps of:

- capturing a set of digital images for the target subject and/or scene, each taken using a different image resolution and/or exposure;
- processing each digital image in the set to determine sections of the imaged subject and/or scene containing moiré pattern information at the corresponding image resolution and/or exposure;
- selecting digital images from the set with sections of the imaged subject and/or scene containing moiré pattern information; and
- generating a merged digital image for the captured subject and/or scene from the selected digital images, the merged digital image comprising the moiré pattern information detected in each of the selected digital images.

Figure 6:
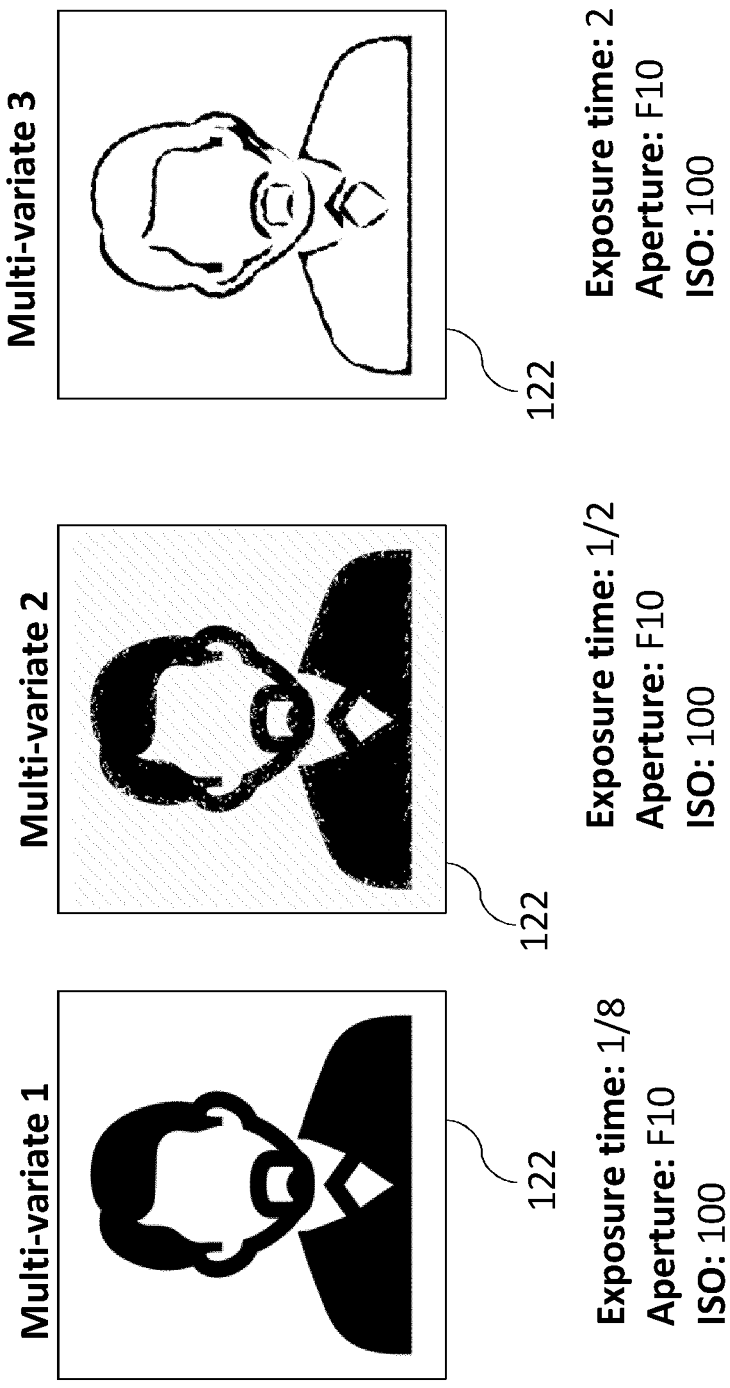
FIG. 6 shows an example of a set of multi-variate digital images captured at different resolutions and/or exposure according to embodiments of the present invention.
Figure 7:
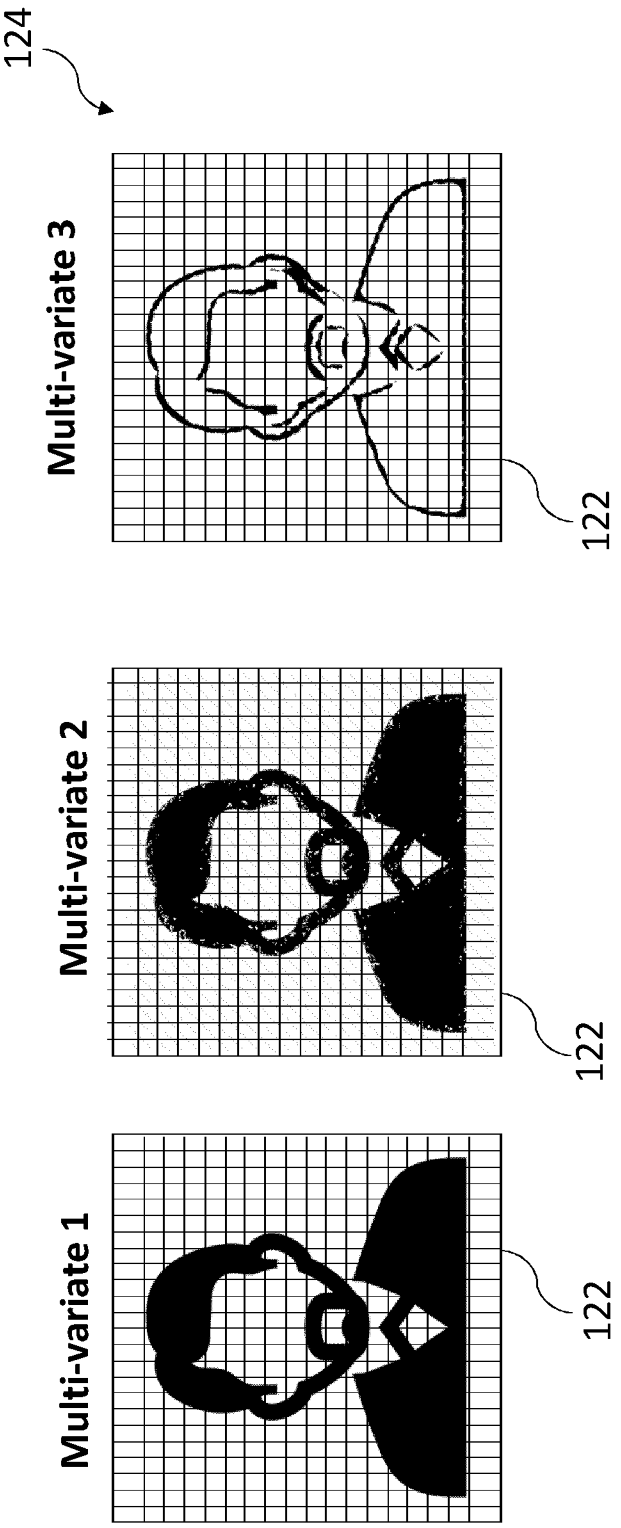
FIG. 7 shows an example of how the captured multi-variate digital images may be segmented according to embodiments of the present invention.
Figure 8:
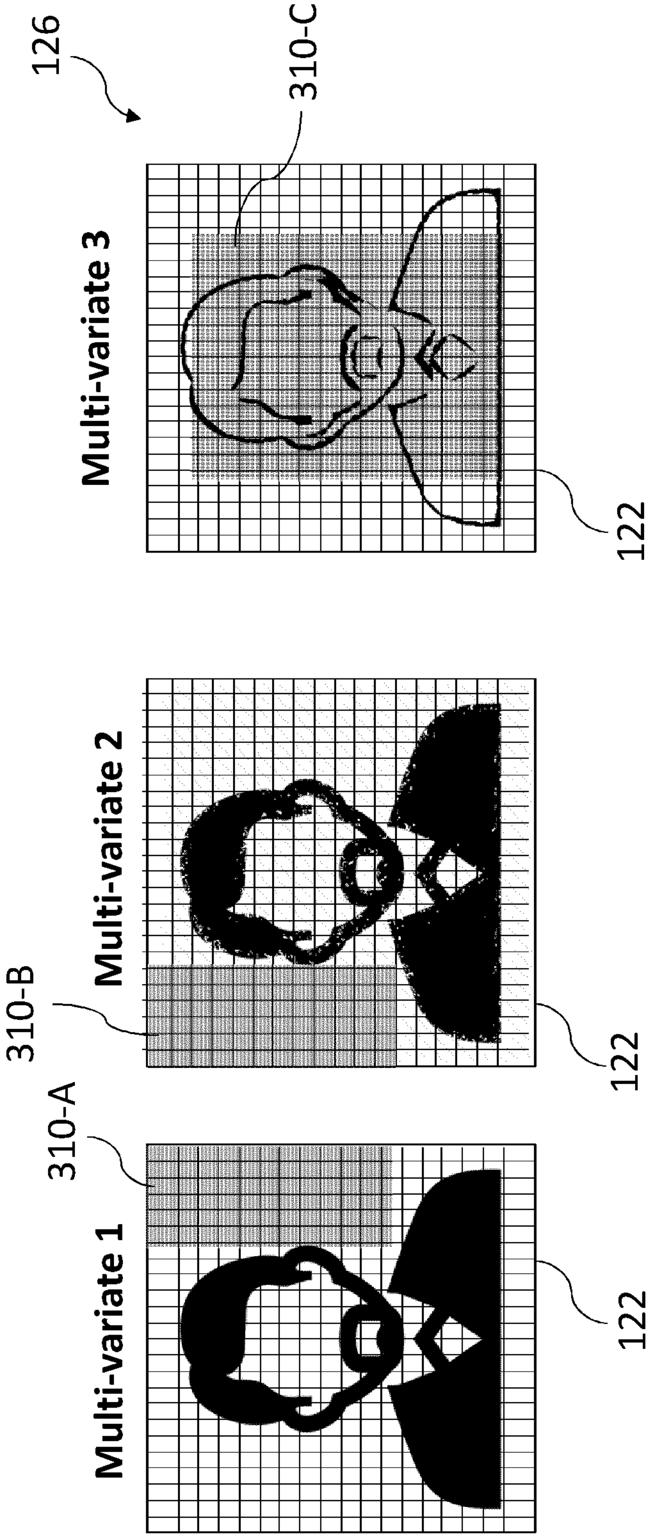
FIG. 8 shows an example of how different moiré patterns may be detected in the different digital images according to embodiments of the present invention.
Figure 9:
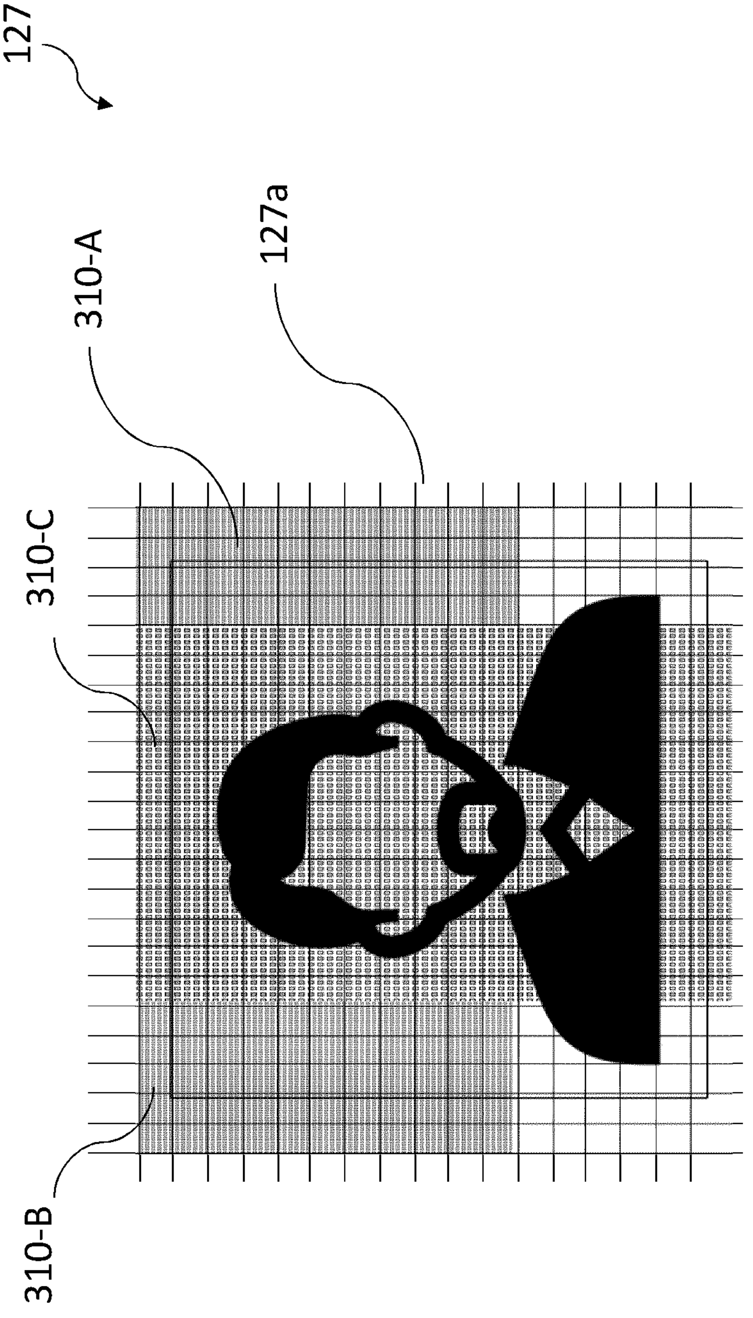
FIG. 9 shows an example of a merged digital image according to embodiments of the present invention.
Figure 10:
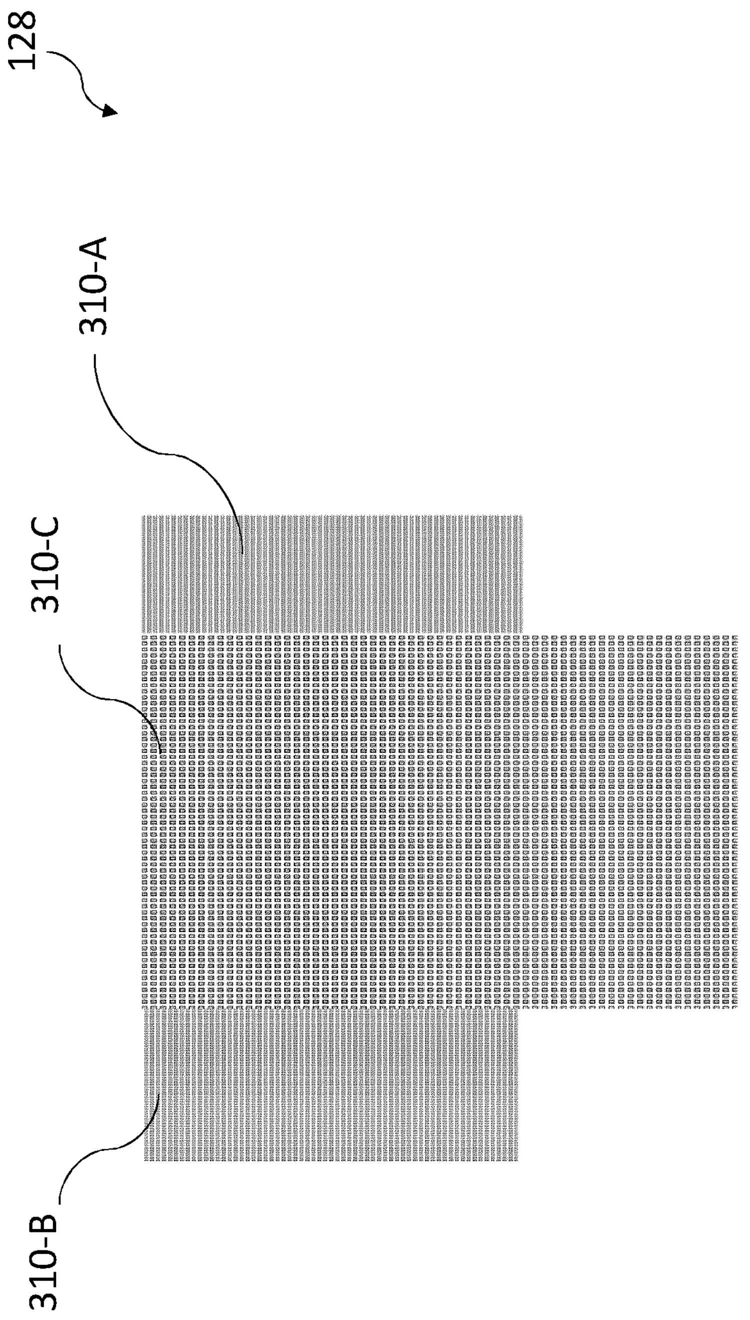
FIG. 10 shows an example of a merged image of the moiré patterns detected in the set of digital images according to embodiments of the present invention.

FIGS. 6 to 10 show examples of how a fused image of moiré patterns in the set of digital images may be generated. For example, as shown in FIG. 6, a set of three multi-variate images 122 of the face of a person may be captured using a camera. Each image may be captured at a different resolution and/or exposure, resulting in a variation of the light intensity within the set of digital images 122. For example, each digital images 122 may be captured at a different exposure time, e.g. ⅛, ½, 2, while the remaining parameters, e.g. ISO and aperture, may remain the same. It should be noted that the other parameters may also be adjusted as needed. Once captured, digital images 122 may be segmented into a grid of predetermined dimensions using an image segmentation module 124, as shown in FIG. 7. Based on the segmentation, the light intensity profile of each digital image 122 may be determined. The moiré patterns 310-A, 310-B, and 310C, may be detected in each digital image 122 using a moiré pattern profiling module 126, as shown in FIG. 8. The relevant digital images containing moiré patterns of a certain frequency and/or profile, in this case all three, are merged using a moiré pattern fusion module 127 generate a merged digital image 127*a* containing the moiré patterns from all the relevant images 122, as shown in FIG. 9. The merged digital image 127*a* may be an HDR image, thus containing details from all relevant digital images 122. From the merged digital image 127*a* the fused moiré pattern image 128 may be extracted, as shown in FIG. 10.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in the computer and that, when read and executed by one or more processors in a computer, cause that computer to perform the operations necessary to execute operations and/or elements embodying the various aspects of the embodiments of the invention. The computer-readable program instructions for carrying out operations of the embodiments of the invention may be, for example, assembly language or either source code or object code is written in any combination of one or more programming languages.

The program code embodied in any of the applications/modules described herein is capable of being individually or collectively distributed as a program product in a variety of different forms. In particular, the program code may be distributed using the computer-readable storage medium having the computer-readable program instructions thereon for causing a processor to carry out aspects of the embodiments of the invention. Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other robust state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or an external computer or external storage device via a network. Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions/acts specified in the flowcharts, sequence diagrams, and/or block diagrams. The computer program instructions may be provided to one or more processors of a general-purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the Applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicants general inventive concept.

The invention claimed is:

1. A method for detecting moiré pattern information in digital images, the method comprising the steps of:

receiving a set of digital images of a subject and/or scene, the set of digital images comprising images captured by one or more cameras and at different resolutions and/or exposure;

processing each digital image in the set to determine sections of the imaged subject and/or scene containing moiré pattern information at the corresponding image resolution and/or exposure, the processing including aligning the subject and/or scene captured in each of the digital images in the set;

selecting digital images from the set with sections of the imaged subject and/or scene containing moiré pattern information; and generating a merged digital image for the captured subject and/or scene from the selected digital images, the merged digital image comprising the moiré pattern information detected in each of the selected digital images.

2. The method of claim 1, wherein processing the digital images comprises segmenting each digital image into a grid of predetermined dimensions.

3. The method of claim 2, wherein processing of the digital images comprises detecting in each digital image the grid sections comprising moiré pattern information.

4. The method of claim 3, wherein processing of the digital images comprises analysing a luminous intensity of each digital image in spatial and temporal direction to determine a combined intensity profile for the set of digital images.

5. The method according to claim 1, wherein generating of the merged digital image comprises combining details from different captured digital images in the set that contain moiré patterns into a single image that represents a range of tonal values within the captured scene and/or object.

6. The method according to claim 1, wherein generating the merged digital image comprises extracting a profile of the moiré pattern information.

7. The method according to claim 1, wherein the merged digital image is a high dynamic range image.

8. A method for determining liveness of biometric features of a person, the method comprising the steps of:

capturing a set of digital images of one or more biometric features of a person, the set of digital images comprising images captured by one or more cameras and at different resolutions and/or exposure;

processing each of the digital images in the set to determine sections of the one or more biometric features containing moiré pattern information at the corresponding image resolution and/or exposure;

selecting digital images from the set with the sections of the one or more biometric features containing the moiré pattern information;

generate a merged digital image for the one or more biometric features from the selected digital images, the merged digital image comprising the moiré pattern information detected in each of the selected digital images;

extracting the moiré pattern information from the merged digital image; and determining, based on the extracted moiré pattern information, liveness of the one or more biometric features captured in the set of digital images.

9. The method of claim 8, wherein determining liveness comprises the step of extracting a moiré frequency strength from the moiré pattern information and comparing the extracted moiré frequency strength with a liveness threshold.

10. The method according to claim 9, further comprising:

if the extracted moiré frequency strength is within a first range from the liveness threshold, validating the merged digital image of the one or more biometric features; and otherwise rejecting the merged digital image.

11. The method according to claim 8, wherein capturing of the digital images comprises varying the resolution and/or exposure of one or more cameras within a predefined range between successive capturing of digital images of the one or more biometric features.

12. The method according to claim 11, wherein the resolution and/or exposure of the camera is varied by a predetermined value for each digital image in the set.

13. The method according to claim 8, wherein the one or more biometric features are facial features.

14. Aliveness detection system for biometric authentication, the system comprising:

at least one camera configured to capture a set of digital images of biometric features of a person presented for biometric authentication; and a processor configured to determine liveness of the biometric features by:

processing each of the digital images in the set to determine sections of the biometric features containing moiré pattern information at the corresponding image resolution and/or exposure;

selecting digital images from the set with the sections of the biometric features containing the moiré pattern information;

generate a merged digital image for the biometric features from the selected digital images, the merged digital image comprising the moiré pattern information detected in each of the selected digital images;

extracting the moiré pattern information from the merged digital image; and determining, based on the extracted moiré pattern information, liveness of the biometric features captured in the set of digital images.

* * * * *